(12) United States Patent
He et al.

(10) Patent No.: US 12,085,222 B2
(45) Date of Patent: Sep. 10, 2024

(54) METHOD FOR CONTROLLING DISPLAY APPARATUS, AND DISPLAY APPARATUS

(71) Applicant: Shanghai Tianma Micro-Electronics Co., Ltd., Shanghai (CN)

(72) Inventors: Yongxin He, Shanghai (CN); Shouzheng Wu, Shanghai (CN)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 282 days.

(21) Appl. No.: 17/674,733

(22) Filed: Feb. 17, 2022

(65) Prior Publication Data

US 2022/0171436 A1    Jun. 2, 2022

(30) Foreign Application Priority Data

Oct. 13, 2021 (CN) .......................... 202111190810.4

(51) Int. Cl.
| | |
|---|---|
| *G06F 1/16* | (2006.01) |
| *F16M 11/08* | (2006.01) |
| *F16M 11/18* | (2006.01) |

(52) U.S. Cl.
CPC ............. *F16M 11/18* (2013.01); *F16M 11/08* (2013.01)

(58) Field of Classification Search
None
See application file for complete search history.

(56) References Cited

U.S. PATENT DOCUMENTS

| | | | | |
|---|---|---|---|---|
| 9,164,551 B2* | 10/2015 | Chen | ...................... | G06F 1/1669 |
| 10,314,416 B2* | 6/2019 | Kim | ........................ | A47G 1/06 |
| 11,209,870 B1* | 12/2021 | Li | ....................... | G06F 3/03547 |
| 11,650,631 B2* | 5/2023 | Watamura | .............. | F16M 11/10 |
| | | | | 361/679.26 |
| 2021/0410307 A1* | 12/2021 | Ding | ..................... | G06F 1/1641 |

FOREIGN PATENT DOCUMENTS

| | | |
|---|---|---|
| CN | 203912007 U | 10/2014 |
| CN | 111474988 A | 7/2020 |
| CN | 111739420 A | 10/2020 |
| WO | WO-2021258461 A1 * 12/2021 | ........... G06F 1/1641 |

OTHER PUBLICATIONS

First Chinese Office Action mailed on Mar. 26, 2024, issued in the corresponding Chinese App. No. 202111190810.4 filed on Oct. 13, 2021, and its English translation thereof; 20 pages.

* cited by examiner

*Primary Examiner* — Anthony Q Edwards
*Assistant Examiner* — Rashen E Morrison
(74) *Attorney, Agent, or Firm* — CHRISTENSEN O'CONNOR JOHNSON KINDNESS PLLC

(57) ABSTRACT

A method for controlling a display apparatus, and a display apparatus are provided. In an embodiment, the display apparatus includes a flexible display screen and a bottom shell. In an embodiment, the bottom shell is at a side of the flexible display screen away from a light-exiting direction of the display apparatus. In an embodiment, the bottom shell includes first and second shells, the second shell is at a side of the first shell away from the flexible display screen. In an embodiment, the method includes controlling the first shell and the flexible display screen to be synchronously deployed or retracted, and controlling at least a part of the second shell to move away from or toward the first shell at least along a first direction, such that a preset angle is formed between the first shell and at least a part of the second shell.

20 Claims, 18 Drawing Sheets

S1 — The first shell and the flexible display screen are controlled to be synchronously deployed or synchronously retracted, and at least a part of the second shell is controlled to move away from or toward the first shell at least along the first direction, such that a preset angle is formed between the first shell and at least a part of the second shell, and the first direction x is perpendicular to a plane of the flexible display screen 1 that is deployed.

FIG. 4

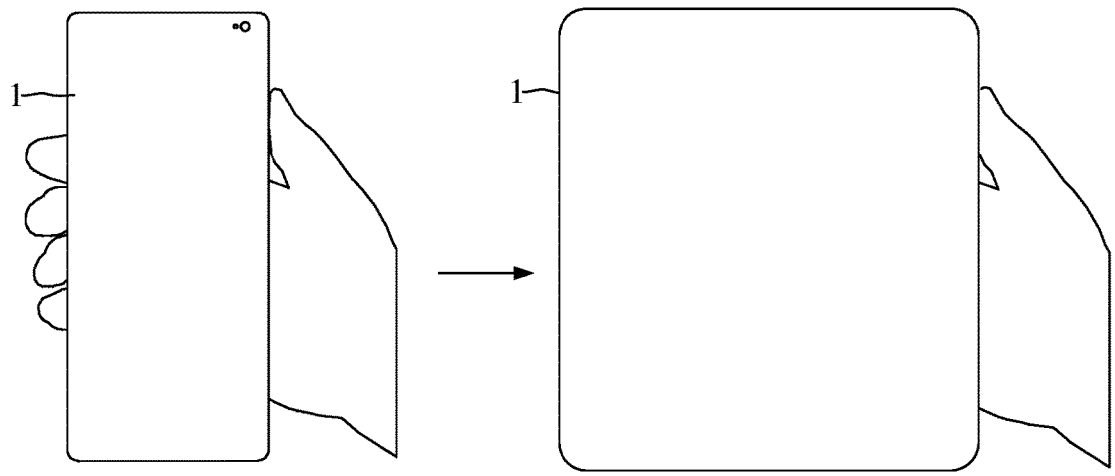

FIG. 5

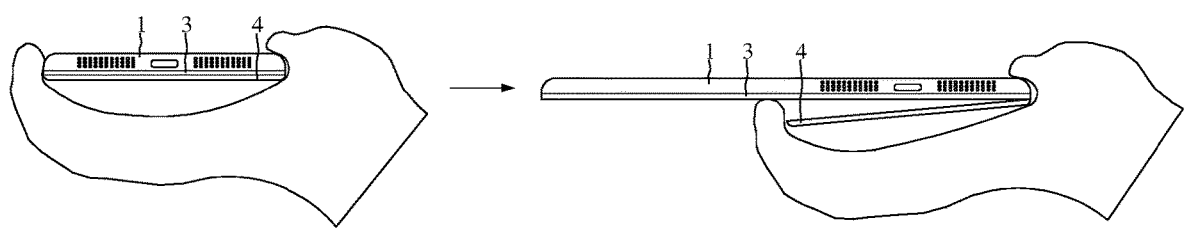

FIG. 6

METHOD FOR CONTROLLING DISPLAY APPARATUS, AND DISPLAY APPARATUS

CROSS-REFERENCE TO RELATED APPLICATION

The present application claims priority to Chinese Patent Application No. 202111190810.4, filed on Oct. 13, 2021, the content of which is incorporated herein by reference in its entirety.

TECHNICAL FIELD

The present disclosure relates to the field of display technologies, and, in particular, to a method for controlling the display apparatus, and a display apparatus.

BACKGROUND

In order to enable display apparatuses to have a large display screen and portability simultaneously, windable or foldable display apparatuses have emerged.

For each of these types of display apparatuses, when it is folded/wound, the display screen has a small size, and a user can grasp and operate it with only one hand; and when it is unfolded/unwound, the display screen has a larger size, and it is difficult for the user to grasp it with only one hand and the user needs to operate it with two hands. Moreover, for a user with small hands, the display apparatus is easy to drop during the unfolding/unwinding process.

SUMMARY

In a first aspect of the present disclosure, a method for controlling a display apparatus is provided. In an embodiment, the display apparatus includes a flexible display screen and a bottom shell, the bottom shell is located at a side of the flexible display screen facing away from a light-exiting direction of the display apparatus, the bottom shell includes a first shell and a second shell, and the second shell is located at a side of the first shell facing away from the flexible display screen. In an embodiment, the method includes controlling the first shell and the flexible display screen to be synchronously deployed or synchronously retracted, and controlling at least a part of the second shell to move away from or toward the first shell at least along a first direction so that a preset angle is formed between the first shell and the at least a part of the second shell. The first direction is perpendicular to a plane of the flexible display screen that is deployed.

In a second aspect of the present disclosure, a display apparatus is provided. In an embodiment, the display apparatus includes: a flexible display screen; and a bottom shell located at a side of the flexible display screen facing away from a light-exiting direction of the display apparatus. In an embodiment, the bottom shell includes a first shell and a second shell. In an embodiment, the first shell and the flexible display screen are synchronously deployed or synchronously retracted. In an embodiment, the second shell is located at a side of the first shell facing away from the flexible display screen, and the at least a part of the second shell moves away from or toward the first shell at least along a first direction, in such a manner that a preset angle is formed between the first shell and the at least a part of the second shell; and the first direction is perpendicular to a plane of the flexible display screen that is deployed.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

FIG. 4 is a flowchart showing a method for controlling a display apparatus according to an embodiment of the present disclosure;

FIG. 5 is a top view of a display apparatus grasped with one hand according to an embodiment of the present disclosure;

FIG. 6 is a side view of a display apparatus grasped with one hand according to an embodiment of the present disclosure;

DESCRIPTION OF EMBODIMENTS

In order to better understand technical solutions of the present disclosure, the embodiments of the present disclosure are described in detail with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in an embodiment of the present disclosure and the attached claims are also intended to include plural forms thereof, unless noted otherwise.

It can be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that, although the terms 'first' and 'second' may be used in the present disclosure to describe shells, these shells should not be limited to these terms. These terms are used only to distinguish the shells of the display panel from each other. For example, without departing from the scope of the embodiments of the present disclosure, a first shell may also be referred to as a second shell. Similarly, the second shell may also be referred to as the first shell.

Figure 1:
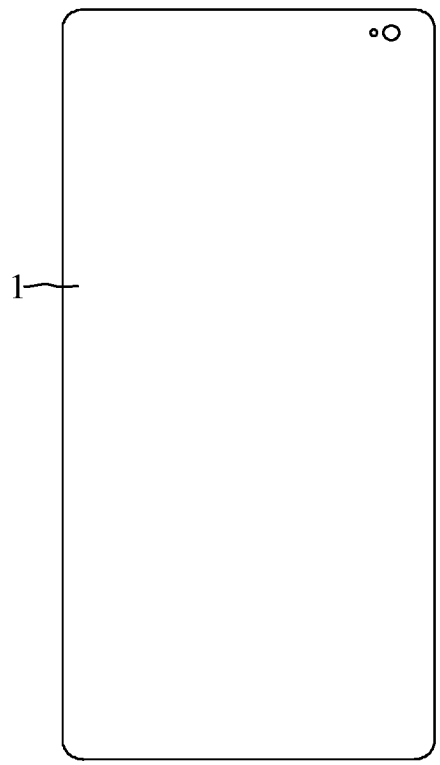
FIG. 1 is a top view of a display apparatus according to an embodiment of the present disclosure.
Figure 2:
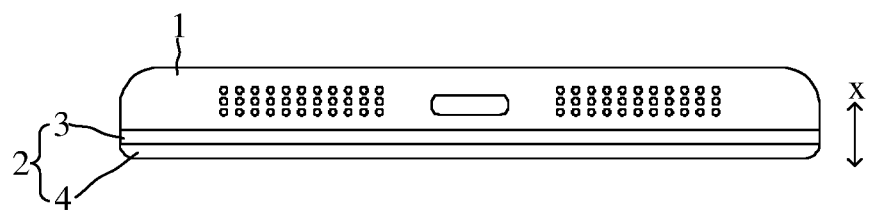
FIG. 2 is a side view of a display apparatus in a retraction state according to an embodiment of the present disclosure.
Figure 3:
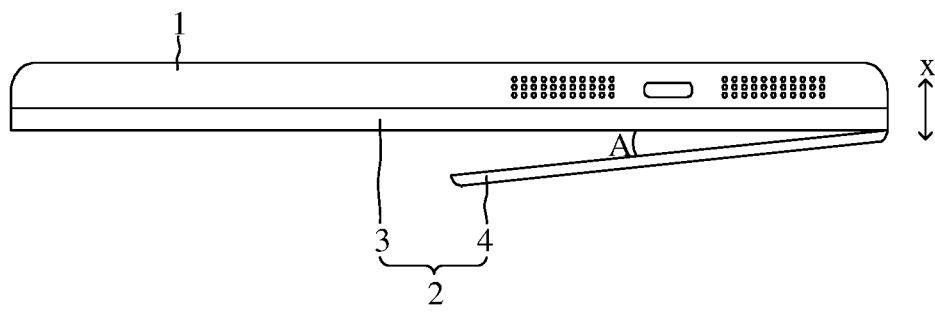
FIG. 3 is a side view of the display apparatus in a deployment state according to an embodiment of the present disclosure.

FIG. 1 is a top view of a display apparatus according to an embodiment of the present disclosure, FIG. 2 is a side view of the display apparatus in a retraction state according to an embodiment of the present disclosure, and FIG. 3 is a side view of the display apparatus in a deployment state according to an embodiment of the present disclosure. In an aspect, the present disclosure provides a method for controlling a display apparatus. As shown in FIG. 1 to FIG. 3, the display apparatus includes a flexible display screen 1 and a bottom shell 2. The bottom shell 2 is located at a side of the flexible display screen 1 facing away from a light-exiting direction of the display apparatus. The bottom shell 2 includes a first shell 3 and a second shell 4. The second shell 4 is located at a side of the first shell 3 facing away from the flexible display screen 1.

FIG. 4 is a flowchart showing a method for controlling a display apparatus according to an embodiment of the present disclosure. Based on the structure described above, and as shown in FIG. 4, the method includes following steps.

In step S1, the first shell 3 and the flexible display screen 1 are controlled to be synchronously deployed or synchronously retracted, and at least a part of the second shell 4 is controlled to move away from or toward the first shell 3 at least along the first direction x, such that a preset angle A is formed between at least a part of the second shell 4 and the first shell 3, and the first direction x is perpendicular to a plane of the flexible display screen 1 that is deployed.

In an embodiment of the present disclosure, the bottom shell 2 includes a first shell 3 and a second shell 4. When the flexible display screen 1 is controlled to be deployed or retracted, the first shell 3 serves as a protective shell for the flexible display screen 1 and is deployed or retracted synchronously with the flexible display screen 1. As for the second shell 4, at least a part of the second shell 4 can move relative to the first shell 3.

FIG. 5 is a top view of a display apparatus grasped with one hand according to an embodiment of the present disclosure, and FIG. 6 is a side view of a display apparatus grasped with one hand according to an embodiment of the present disclosure. For example, as shown in FIG. 5 and FIG. 6, before the flexible display screen 1 is deployed or during the process of deploying the flexible display screen 1, the second shell 4 can be controlled to move away from the first shell 3 to make it tilt up to form a grasping portion. When the second shell 4 is tilted up, the user may feel that the whole display apparatus is tilted up in a direction opposite to the palm of the hand, to improves the user's grasp of the display apparatus by one hand and increase a grasping strength of one hand. In this way, not only is a risk of dropping the display apparatus from the hand e reduced when the display apparatus is deployed, but also the user can continue to hold and operate the display apparatus with one hand after the display apparatus is deployed. It should be noted that, after the display apparatus is deployed, if the user wants to operate with two hands, he/she can also control the second shell 4 to move toward the first shell 3 to close it.

Figure 7:
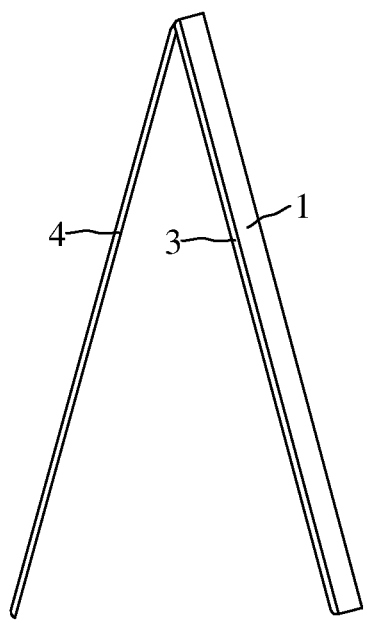
FIG. 7 is a schematic diagram showing support of a second shell according to an embodiment of the present disclosure.

FIG. 7 is a schematic diagram showing support of the second shell 4 according to an embodiment of the present disclosure. When the user needs to be in a movie-viewing mode or a working mode, as shown in FIG. 7, the second shell 4 is controlled to move away from the first shell 3, such that the second shell 4, which is tilted up, can serve as a holder for the display apparatus to support the flexible display screen 1. In this way, there is no need to further provide a holder, thereby further enhancing the user's usage experience.

Figure 8:
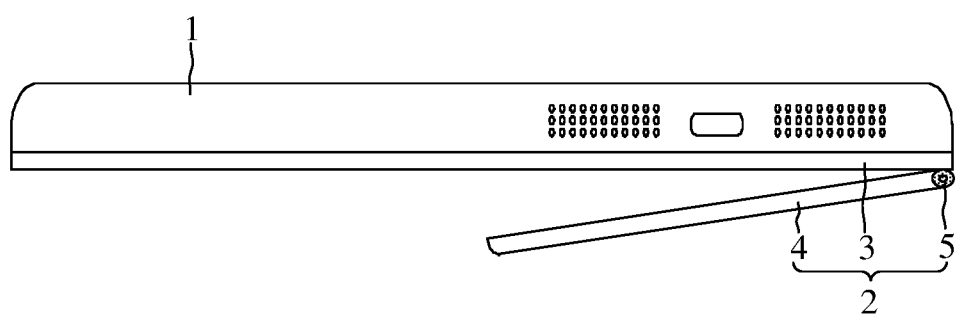
FIG. 8 is a structural schematic diagram showing a rotation portion according to an embodiment of the present disclosure.

FIG. 8 is a structural schematic diagram showing a rotation portion according to an embodiment of the present disclosure. In an embodiment, as shown in FIG. 8, the bottom shell 2 includes a rotation portion 5. The rotation portion 5 may be for example a rotation shaft.

In step S1, the process of controlling at least a part of the second shell 4 to move away from or toward the first shell 3 at least along the first direction x includes the following process: at least a part of the second shell 4 is controlled to rotate around the rotation portion 5 relative to the first shell 3, or, the rotation portion 5 is controlled to drive at least a part of the second shell 4 to rotate relative to the first shell 3, such that at least a part of the second shell 4 can be tilted up relative to the first shell 3 to form a grasping portion.

Figure 9:
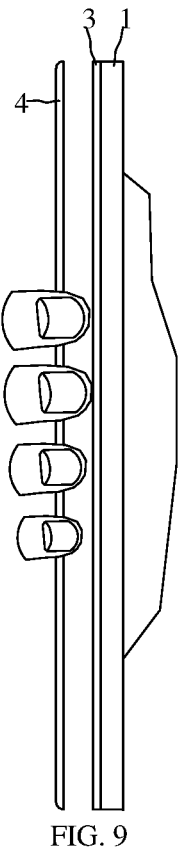
FIG. 9 is a side view of a display apparatus grasped with one hand according to another embodiment of the present disclosure.

In addition, when at least a part of the second shell 4 is tilted up relative to the first shell 3, there is a gap between the tilt-up end of the second shell 4 and the first shell 3. FIG. 9 is a side view of a display apparatus grasped with one hand according to another embodiment of the present disclosure. As shown in FIG. 9, when the user is grasping at least a part of the second shell 4, fingers can insert into the gap between the tilt-up end of the second shell 4 and the first shell 3, such that the second shell 4 can be grasped more tightly, thereby further improving the user's grasping by one hand.

Figure 10:
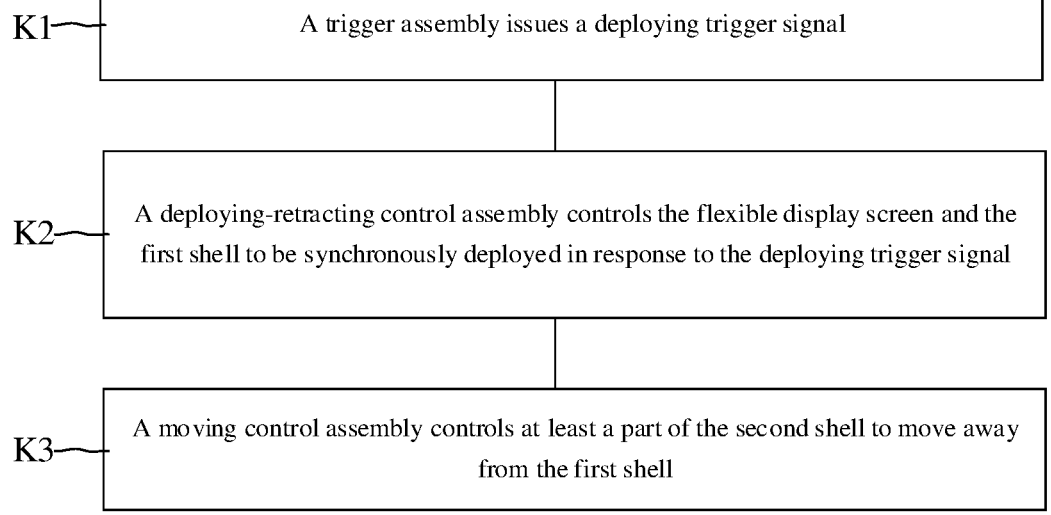
FIG. 10 is a flowchart showing a method for controlling a display apparatus according to another embodiment of the present disclosure.

FIG. 10 is a flowchart showing a method for controlling a display apparatus according to another embodiment of the present disclosure. In an embodiment, as shown in FIG. 10, in step S1, the process of controlling the first shell 3 and the flexible display screen 1 to be synchronously deployed, and controlling at least a part of the second shell 4 to move away from the first shell 3 includes following steps.

In step K1, a trigger assembly issues a deploying trigger signal.

Figure 11:
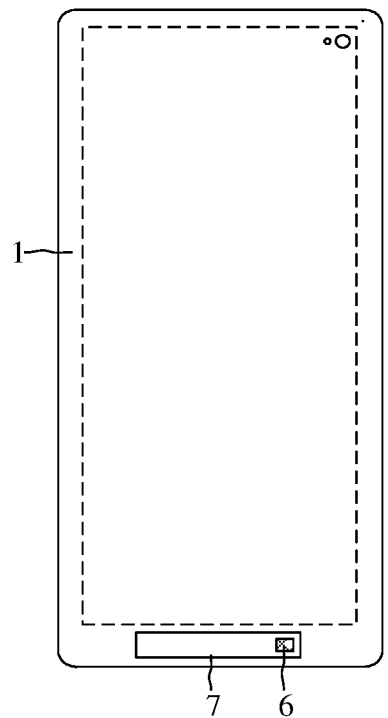
FIG. 11 is a structural schematic diagram showing a trigger assembly according to an embodiment of the present disclosure.
Figure 12:
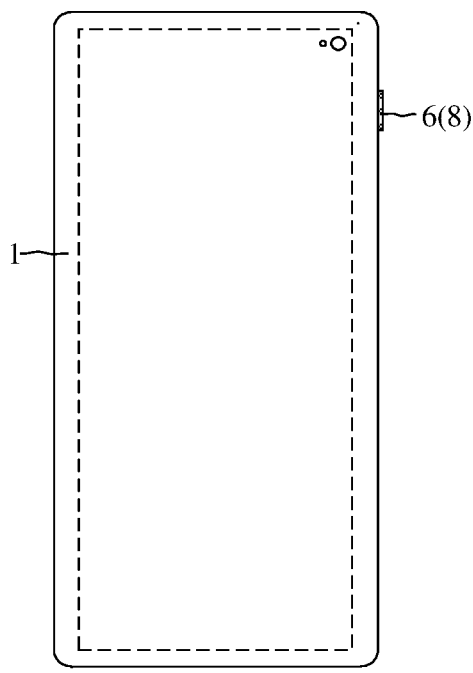
FIG. 12 is a structural schematic diagram showing a trigger assembly according to another embodiment of the present disclosure.

FIG. 11 is a structural schematic diagram showing a trigger assembly according to an embodiment of the present disclosure, and FIG. 12 is a structural schematic diagram showing a trigger assembly according to another embodiment of the present disclosure. In an embodiment, as shown in FIG. 11, the trigger assembly 6 is located in a driving chip 7 of the display apparatus, or, as shown in FIG. 12, the trigger assembly 6 may include a button 8 located at a side of the flexible display screen 1.

In step K2, a deploying-retracting control assembly controls the flexible display screen 1 and the first shell 3 to be synchronously deployed in response to the deploying trigger signal.

In step K3, a moving control assembly controls at least a part of the second shell 4 to move away from the first shell 3.

Figure 13:
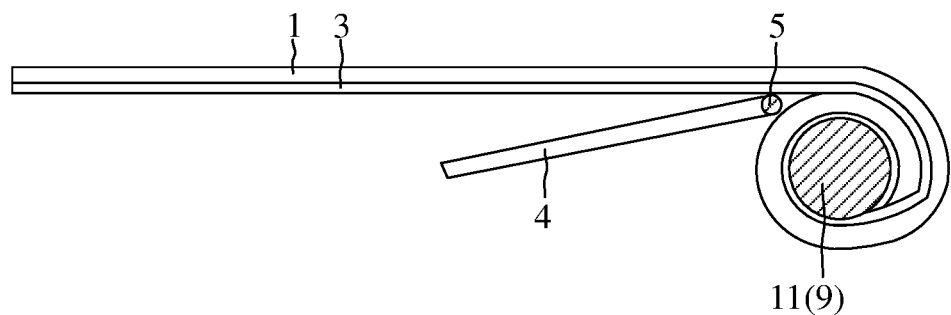
FIG. 13 is a structural schematic diagram showing n deploying-retracting control assembly according to an embodiment of the present disclosure.
Figure 14:
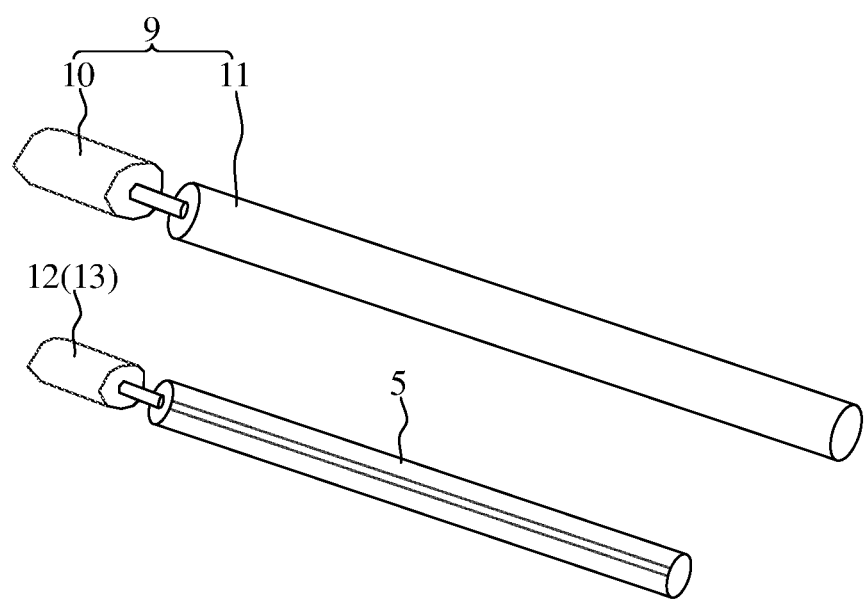
FIG. 14 is a structural schematic diagram showing a moving control assembly according to an embodiment of the present disclosure.

FIG. 13 is a structural schematic diagram showing an deploying-retracting control assembly according to an embodiment of the present disclosure, and FIG. 14 is a structural schematic diagram showing a moving control assembly according to an embodiment of the present disclosure. In an embodiment, as shown in FIG. 13 and FIG. 14, the deploying-retracting control assembly 9 includes a first motor 10 and a reel 11. The first shell 3 and the flexible display 1 are wound on the reel 11. The first motor 10 is configured to control the reel 11 to wind or unwind. For example, the first motor 10 controls the reel 11 to rotate under driving of the deploying trigger signal, and then controls the first shell 3 and the flexible display 1 to be released from the reel 11, that is, controls the first shell 3 and the flexible display 1 to be synchronously deployed to increase the protective performance of a first shell 3 on the flexible display screen 1. The moving control assembly 12 includes a second motor 13. The second motor 13 is configured to control at least a part of the second shell 4 to move relative to the first shell 3. For example, the second motor 13 is fixedly connected to the rotation portion 5, and the second motor 13 controls the rotation portion 5 to rotate, such that the rotation portion 5 drives at least a part of the second shell 4 to tilt up relative to the first shell 3.

In the above driving manner, the second shell 4 and the first shell 3 are separately controlled by the moving control assembly 12 and the deploying-retracting control assembly 9, respectively. The moving control assembly 12 can control the second shell 4 to move earlier or later than the first shell 3, or to move simultaneously with the first shell 3. The control manner of the second shell 4 is more flexible.

Figure 15:
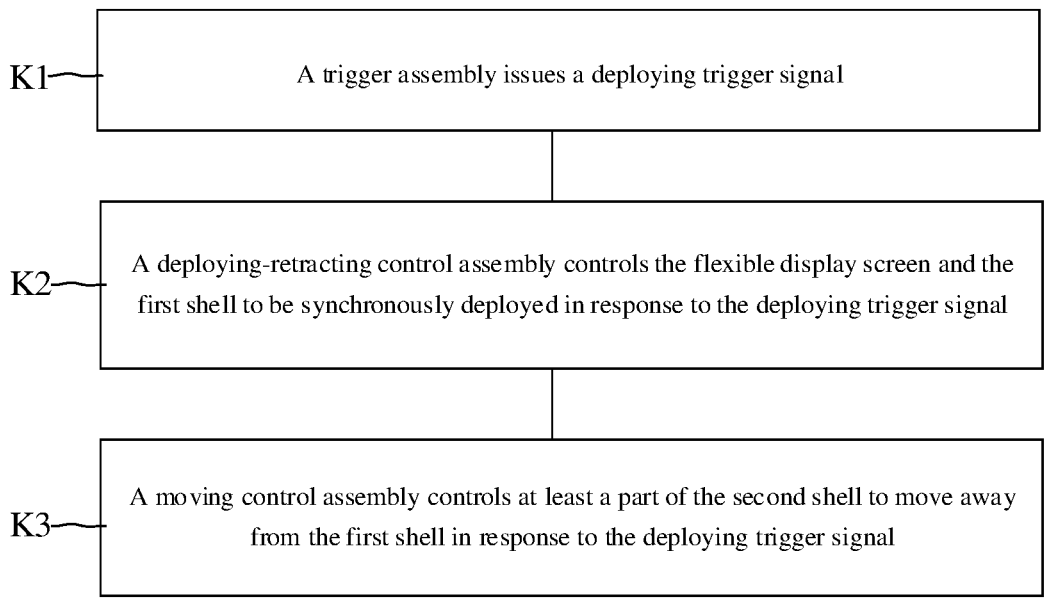
FIG. 15 is a flowchart showing a method for controlling a display apparatus according to another embodiment of the present disclosure.

FIG. 15 is a flowchart showing a method for controlling a display apparatus according to another embodiment of the present disclosure. Further, as shown in FIG. 15, the process of step K3 may include the following process: the moving control assembly 12 controls at least a part of the second shell 4 to move away from the first shell 3 in response to the deploying trigger signal.

In this control mode, the moving control assembly 12 and the deploying-retracting control assembly 9 respond to a same deploying trigger signal. After the trigger assembly 6 issues the trigger signal, the deploying-retracting control assembly 9 controls the flexible display screen 1 and the first shell 3 to be synchronously deployed; meanwhile, the moving control assembly 12 controls at least a part of the second shell 4 to tilt up. In this way, when the flexible display screen 1 is deployed, the second shell 4 is tilted up. While the second shell 4 improves the user's grasping by one hand, the control complexity of the moving control assembly 12 and the deploying-retracting control assembly 9 is reduced, and the time for movement of the whole bottom shell 2 is shortened.

Figure 16:
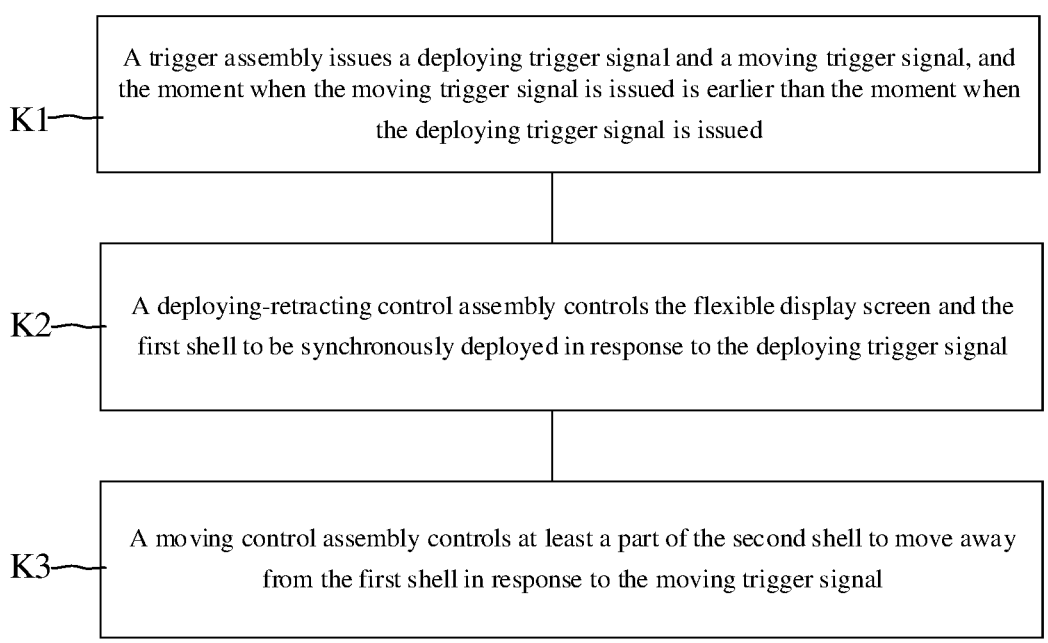
FIG. 16 is a flowchart showing a method for controlling a display apparatus according to another embodiment of the present disclosure.

FIG. 16 is a flowchart showing a method for controlling a display apparatus according to another embodiment of the present disclosure. In another embodiment, as shown in FIG. 16, the process of controlling the first shell 3 and the flexible display screen 1 to be synchronously deployed, and controlling at least a part of the second shell 4 to move away from the first shell 3 further includes the following process: the trigger assembly 6 issues a moving trigger signal, and the time of issuing the moving trigger signal is earlier than the time of issuing the deploying trigger signal.

The process of step K3 may include the following process: the moving control assembly 12 controls at least a part of the second shell 4 to move away from the first shell 3 in response to the moving trigger signal.

In this control mode, the moving control assembly 12 and the deploying-retracting control assembly 9 respond to two different trigger signals, i.e., the deploying trigger signal and the moving trigger signal. Since the moving trigger signal is issued earlier, the moving control assembly 12 has already started to control at least a part of the second shell 4 to tilt up before the deploying-retracting control assembly 9 controls the flexible display screen 1 and the first shell 3 to be deployed. When the flexible display screen 1 starts to be deployed, a large angle is formed between the second shell 4 and the first shell 3, such that the user's fingers can grasp more easily.

Figure 17:
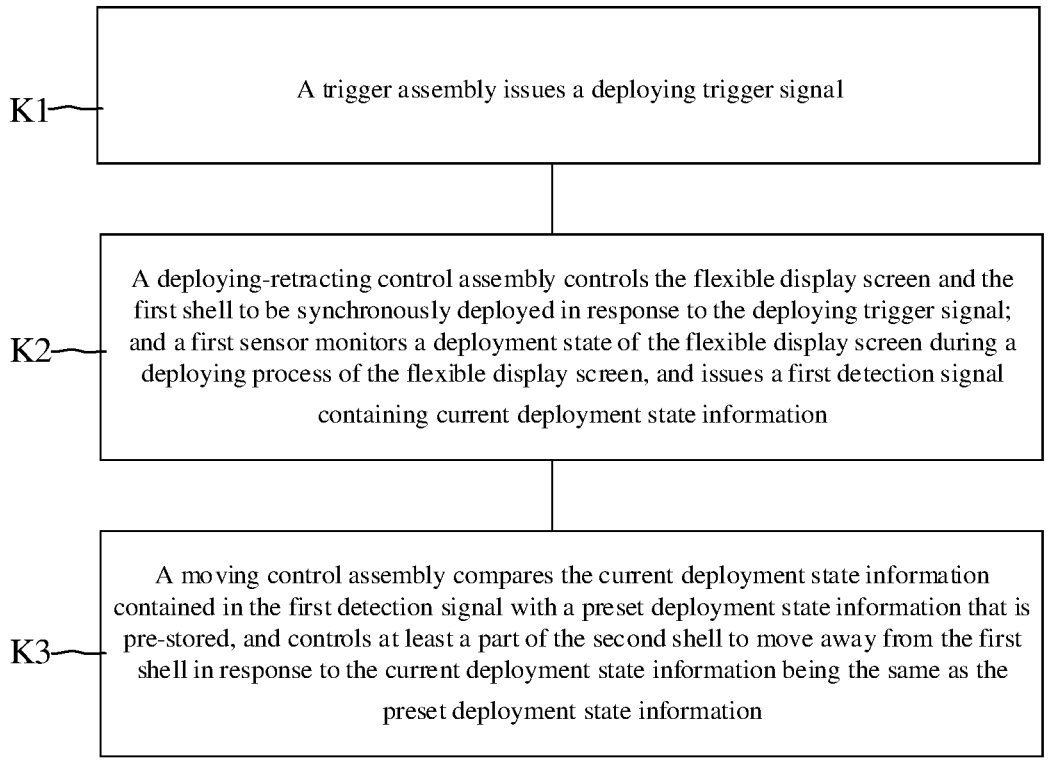
FIG. 17 is a flowchart showing a method for controlling a display apparatus according to another embodiment of the present disclosure.

FIG. 17 is a flowchart showing a method for controlling a display apparatus according to another embodiment of the present disclosure. In another embodiment, as shown in FIG. 17, the process of controlling the first shell 3 and the flexible display screen 1 to be synchronously deployed and controlling at least a part of the second shell 4 to move away from the first shell 3 further includes the following process: a first sensor monitors the deployment state of the flexible display screen 1 during the deploying process of the flexible display screen 1, and issues a first detection signal containing a current deployment state.

The process of step K3 may include the following step: the moving control assembly 12 compares the current deployment state information contained in the first detection signal with a preset deployment state information that is pre-stored, and controls at least a part of the second shell 4 to move away from the first shell 3 in response to the current deployment state information being the same as the preset deployment state information.

In this control mode, whether the second shell 4 is tilted up is selected by the moving control assembly 12 according to the deployment degree of the flexible display screen 1, such that such a tilt-up control mode is more flexible. For example, when the flexible display screen 1 starts to be deployed, the screen size is small, such that the user can still grasp it by one hand. At this time, the moving control assembly 12 does not need to control the second shell 4 to tilt up. However, as the flexible display screen 1 continuously deployed, the screen size is gradually increased. When the screen size is increased to a screen size corresponding to the preset deployment state, it is difficult for the user to grasp by one hand. At this time, the moving control assembly 12 controls at least a part of the second shell 4 to tilt up to form a grasping portion.

It should be noted that, in the embodiments of the present disclosure, the deploying trigger signal may further include deployment degree information. For example, when the deploying trigger signal issued by the trigger assembly 6 includes a deployment degree information of being deployed completely, the deploying-retracting control assembly 9 controls the flexible display screen 1 and the first shell 3 to be deployed to the greatest extent. At this time, the size of the deployed screen can be twice the size of the screen before being deployed. When the deploying trigger signal issued by the trigger assembly 6 includes a deployment degree information of being deployed half, the deploying-retracting control assembly 9 controls the flexible display screen 1 and the first shell 3 to be deployed half. At this time, the size of the deployed screen can be 1.5 times the size of the screen before being deployed. In this way, when the user only needs to control the flexible display 1 to be partially deployed, if the screen size is still quite small after the flexible display 1 is deployed, the screen size does not reach a screen size corresponding to the preset deployment state, the user can still grasp by one hand, such that there is no need to control the second shell 4 to tilt up, thereby saving power consumption to a certain extent.

Further, the current deployment state information is stretching ratio information or folding angle information of the flexible display screen 1.

In an embodiment, the display apparatus is a stretchable display apparatus, and has a retraction state corresponding to the contraction/closing state. When the flexible display screen 1 is deployed, a stretching ratio of the flexible display screen 1 is gradually increased. By real-time monitoring the stretching ratio information of the flexible display screen 1, whether the current stretching state of the flexible display screen 1 has reached a preset stretching state can be real-time determined, and then whether the second bottom shell 2 is required to control to be tilted up in the current state can be accurately determined.

In another embodiment, the display apparatus is a foldable display apparatus, and has a retraction state corresponding to a folding state. When the flexible display 1 is deployed, a folding angle of the flexible display 1 is changed. By real-time monitoring the folding angle information of the flexible display 1, whether the current deployment state of the flexible display screen 1 has reached a preset deployment state can be real-time determined, and then whether the second bottom shell 2 is required to control to be tilted up in the current state can be accurately determined.

Further, the process of controlling the first shell 3 and the flexible display screen 1 to be synchronously deployed, and controlling at least a part of the second shell 4 to move away from the first shell 3 further includes the following process: a second sensor detects the deployment state of the flexible display screen 1, and issues a second detection signal containing screen size information; and the moving control assembly 12 adjusts an angle between at least a part of the second shell 4 and the first shell 3 based on the screen size information contained in the second detection signal.

Referring to FIG. 7, when the user needs to be in a movie-viewing mode or a working mode, the second shell 4 which is tilted up can be used as a holder for the display apparatus. The second sensor is used to detect the screen size information of the flexible display screen 1, and the moving control assembly 12 controls the tilting angle of the second shell 4 according to the detected screen size information, such that when the flexible display screen 1 has a larger screen size after being deployed, the second shell 4 is controlled to be tilted up at a larger angle; and when the flexible display 1 has a small screen size, the second shell 4 is controlled to be tilted up at a smaller angle, thereby matching the tilt-up angle of the second shell 4 with the screen size of the flexible display 1 after being deployed, and improving the supporting stability of the second shell 4.

In another embodiment, the moving control assembly 12 is in contact with the trigger assembly 6 and is detachably connected to at least a part of the second shell 4.

Figure 18:
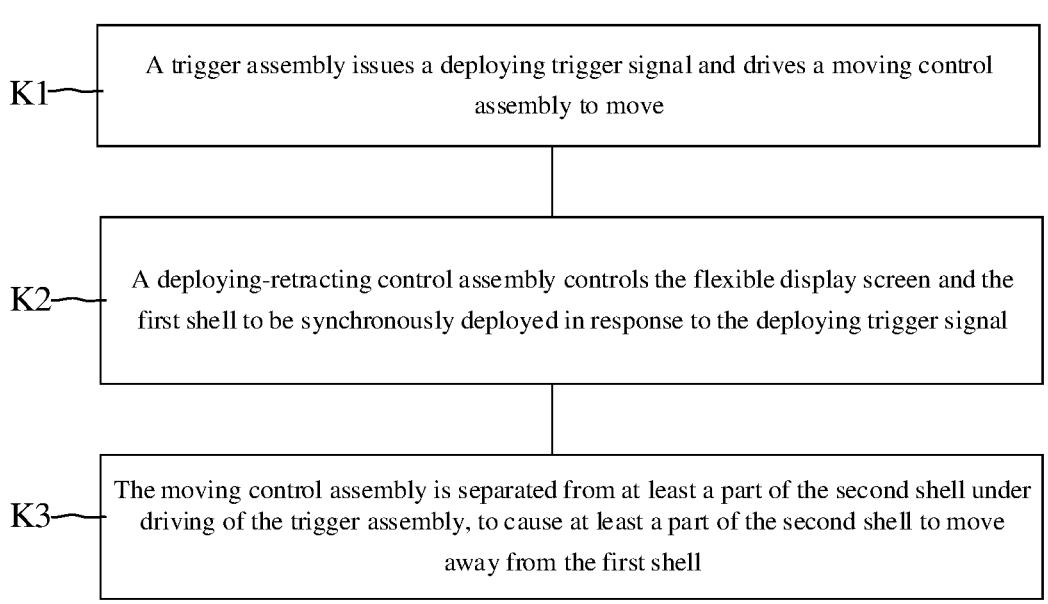
FIG. 18 is a flowchart showing a method for controlling a display apparatus according to another embodiment of the present disclosure.

FIG. 18 is a flowchart showing a method for controlling a display apparatus according to another embodiment of the present disclosure. As shown in FIG. 18, the process of controlling the first shell 3 and the flexible display screen 1 to be synchronously deployed and controlling at least a part of the second shell 4 to move away from the first shell 3 further includes the following process: the trigger assembly 6 drives the moving control assembly 12 to move.

The process of controlling at least a part of the second shell 4 to move away from the first shell 3 by the moving control assembly 12 includes the following process: the moving control assembly 12 is separated from at least a part of the second shell 4 under driving of the trigger assembly 6, such that at least a part of the second shell 4 moves away from the first shell 3.

Figure 19:
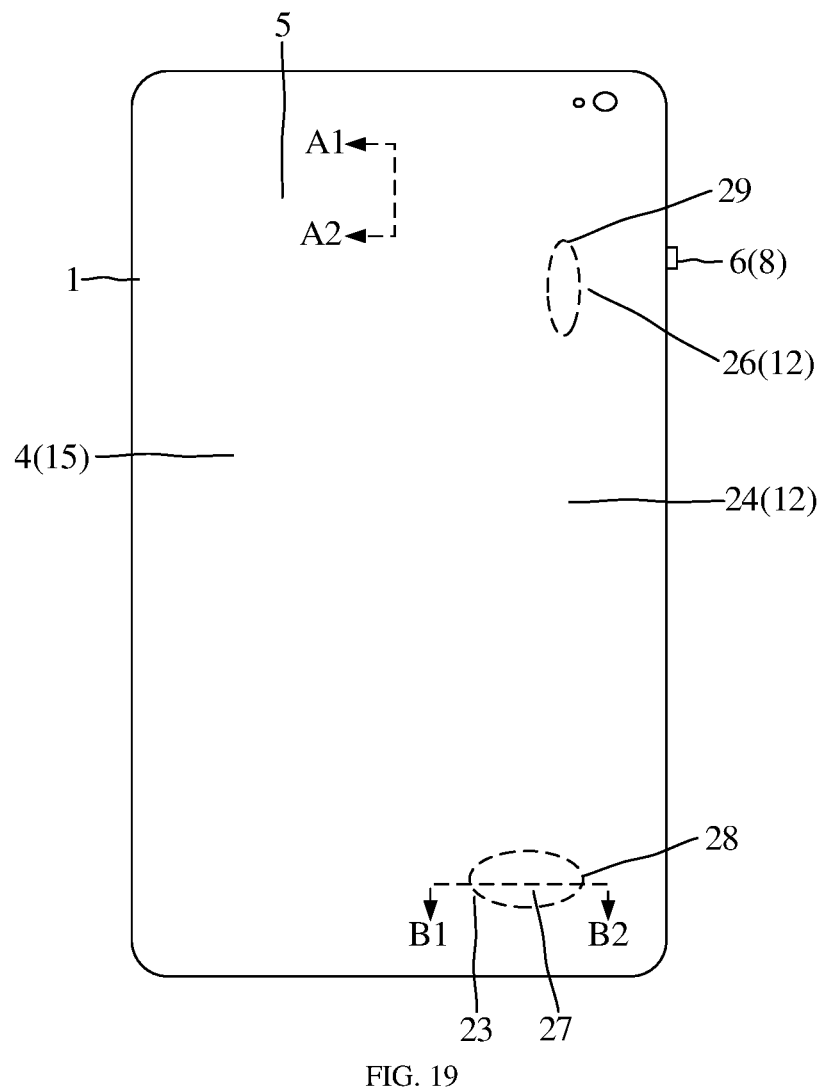
FIG. 19 is a structural schematic diagram showing a moving control assembly according to another embodiment of the present disclosure.
Figure 20:
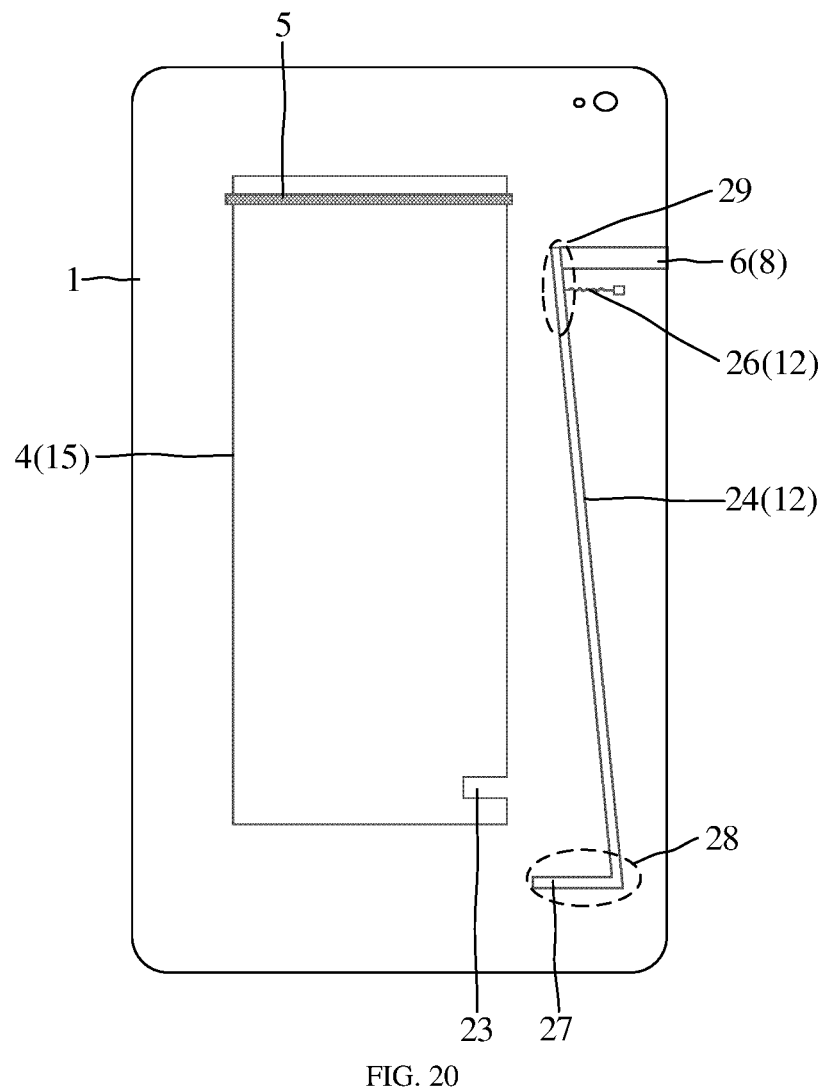
FIG. 20 is a structural schematic diagram showing a moving control assembly according to another embodiment of the present disclosure.

FIG. 19 is a structural schematic diagram showing a moving control assembly according to another embodiment of the present disclosure, and FIG. 20 is a structural schematic diagram showing a moving control assembly according to another embodiment of the present disclosure. In an embodiment, as shown in FIG. 19 and FIG. 20, the trigger assembly 6 includes a button 8 located at a side of the flexible display screen 1. The trigger assembly 6 is configured not only to issue a deploying trigger signal, but also to drive the moving control assembly 12 to move. The moving control assembly 12 is in contact with the trigger assembly 6 and is detachably connected to at least a part of the second shell 4. When the button 8 is not pressed, the moving control assembly 12 limits at least a part of the second shell 4 to make the second shell 4 keep in a closed state. When the trigger assembly 6 is pressed, the trigger assembly 6 applies a pushing force to the moving control assembly 12, and the moving control assembly 12 is separated from at least a part of the second shell 4 under driving of the trigger assembly 6, such that at least a part of the second shell 4 is tilted up, which facilitates the user to grasp the second shell 4, thereby improving the grasping by one hand.

In addition, in an embodiment of the present disclosure, the process of controlling the first shell 3 and the flexible display screen 1 to be synchronously retracted includes following steps.

In step H1, the trigger assembly 6 issues a retracting trigger signal.

In step H2, in response to the deploying trigger signal, the deploying-retracting control assembly 9 controls the flexible display screen 1 and the first shell 3 to be synchronously retracted. Exemplarily, a first motor of the deploying-retracting control assembly 9 controls the reel 11 to rotate under driving of the retracting trigger signal, such that the flexible display screen 1 and the first shell 3 are driven to be wound on the reel 11 to achieve the synchronous retraction of the flexible display screen 1 and the first shell 3.

In an embodiment, the process of controlling the first shell 3 and the flexible display screen 1 to be retracted synchronously further includes the following process: the trigger assembly 6 further issues a closing trigger signal. At this time, the process of controlling at least a part of the second shell 4 to at least move toward the first shell 3 includes the following process: the moving control assembly 12 controls at least a part of the second shell 4 to move toward the first shell 3 in response to the closing trigger signal. Exemplarily, a second motor 13 of the moving control assembly 12 controls the rotation portion 5 to rotate in response to the closing trigger signal, such that the rotation portion 5 drives at least a part of the second shell 4 to move toward the first shell 3, thereby achieving the closure of the second shell 4.

Further, the moment when the trigger assembly 6 issues the closing trigger signal is later than the moment when the trigger assembly 6 issues the retracting trigger signal, such that after the deploying-retracting control assembly 9 controls the flexible display screen 1 and the first shell 3 to be retracted, the moving control assembly 12 starts to control the closure of the second shell 4, such that the user can still grasp the second shell 4 during the retraction process of the flexible display screen 1, further reducing a risk of dropping the display apparatus from the hand.

In another embodiment, the user can manually close the second shell 4. Exemplarily, based on the structure shown in FIG. 19 and FIG. 20, after the deploying-retracting control assembly 9 controls the flexible display screen 1 and the first shell 3 to be deployed or retracted, the second shell 4 is manually closed.

Taking a control manner as an example, the control process of the display apparatus will be described below in detail. The control process of the display apparatus may include following steps.

In step W1, the trigger assembly 6 issues a moving trigger signal.

In step W2, a second motor 13 of the moving control assembly 12 controls the rotation portion 5 to rotate in response to the moving trigger signal, such that the rotation portion 5 drives at least a part of the second shell 4 to be tilted up.

In step W3, the trigger assembly 6 issues a deploying trigger signal.

In step W4, a first motor 10 of the deploying-retracting control assembly 9 controls the reel 11 to rotate in response to the deploying trigger signal, such that the flexible display screen 1 and the first shell 3 are released from the reel 11, thereby controlling the flexible display screen 1 and the first shell 3 to be synchronously deployed.

In step W5, the trigger assembly 6 issues a retracting trigger signal.

In step W6, the first motor 10 of the deploying-retracting control assembly 9 controls the reel 11 to rotate in response to the retracting trigger signal, such that the flexible display screen 1 and the first shell 3 are wound on the reel 11, thereby controlling the flexible display screen 1 and the first shell 3 to be synchronously retracted.

In step W7, the trigger assembly 6 issues a closing trigger signal.

In step W8, a second motor 13 of the moving control assembly 12 controls the rotation portion to rotate in response to the closing trigger signal, such that the rotation portion drives at least a part of the second shell 4 to be closed.

Based on the same inventive concept, an embodiment of the present disclosure provides a display apparatus. Referring to FIG. 1 to FIG. 3 again, the display apparatus includes a flexible display screen 1 and a bottom shell 2. The bottom shell 2 is located at a side of the flexible display screen 1 facing away from to a light-exiting direction of the display apparatus. The bottom shell 2 includes a first shell 3 and a second shell 4.

The first shell 3 and the flexible display screen 1 are synchronously deployed or synchronously retracted. The second shell 4 is located at a side of the first shell 3 facing away from the flexible display screen 1. At least a part of the second shell 4 moves away from or toward the first shell 3 at least along a first direction x, such that a preset angle is formed between at least a part of the second shell 4 and the first shell 3. The first direction x is perpendicular to a plane of the flexible display screen 1 that is deployed.

The method for controlling the display apparatus has been described in detail in the above embodiments, and will not be elaborated herein.

In an embodiment of the present disclosure, referring to FIG. 5 and FIG. 6, the bottom shell 2 includes a first shell 3 and a second shell 4. The first shell 3 is deployed or retracted synchronously with the flexible display screen 1 and can be used as a protective shell of the flexible display screen 1. The second shell 4 can be tilted up relative to the first shell 3 to form a grasping portion, such that the user's grasping the display apparatus by one hand can be effectively improved when the flexible display screen 1 is deployed. It not only enables the user to grasp the display apparatus with one hand after the display apparatus is deployed, but also reduces a risk of dropping the display apparatus from the hand when the display apparatus is deployed.

In addition, referring to FIG. 7, when the user needs to be in a movie-viewing mode or a working mode, the second shell 4 is controlled to move away from the first shell 3, such that the tilt-up second shell 4 can also be used as a holder for the display apparatus, thus there is no need to further provide a holder, thereby further optimizing the user's usage experience.

In an embodiment, referring to FIG. 8 again, the bottom shell 2 includes a rotation portion 5 which can be a rotation shaft or the like. At least a part of the second shell 4 rotates around the rotation portion 5 relative to the first shell 3, or the rotation portion 5 drives at least a part of the second shell 4 to rotate relative to the first shell 3.

By controlling at least a part of the second shell 4 to rotate relative to the first shell 3, a certain preset angle is formed between at least a part of the second shell 4 and the first shell 3, such that the second shell 4 can be tilted up to form a grasping portion. Moreover, when at least a part of the second shell 4 is tilted up relative to the first shell 3, a gap is formed between a tilt-up end of the second shell 4 and the first shell 3. Referring to FIG. 9, when the user is grasping a part of the second shell 4, fingers can insert into the gap between the tilt-up end of the second shell 4 and the first shell 3, such that the second shell 4 can be grasped more tightly, thereby further improving the user's grasping by one hand.

Figure 21:
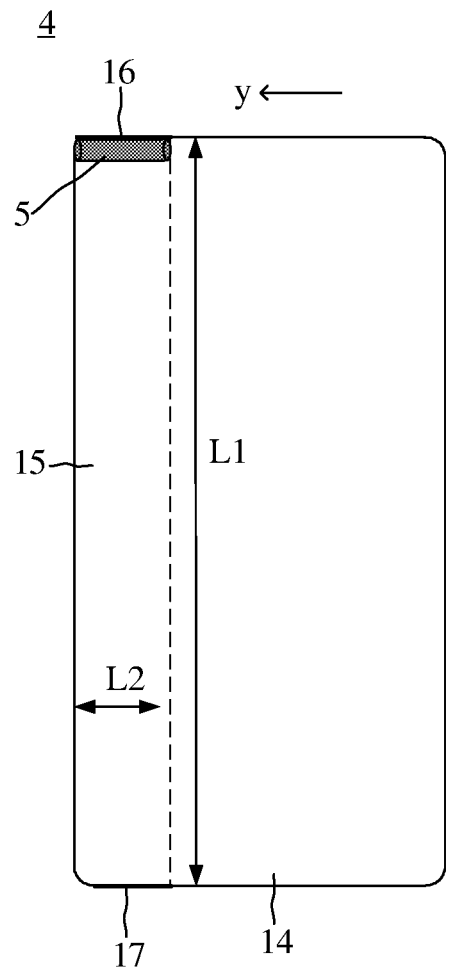
FIG. 21 is a top view of a second shell according to an embodiment of the present disclosure.
Figure 22:
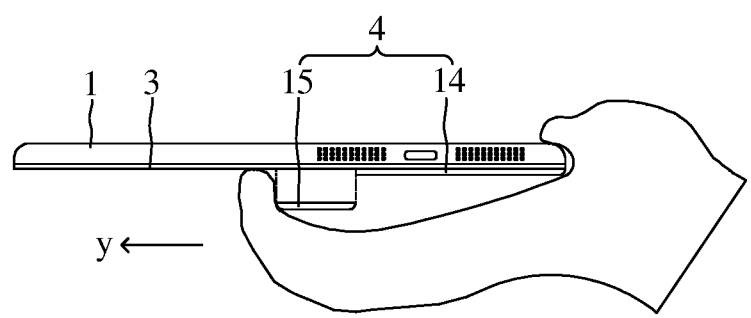
FIG. 22 is a side view of a display apparatus when the second shell is tilted up according to an embodiment of the present disclosure.
Figure 23:
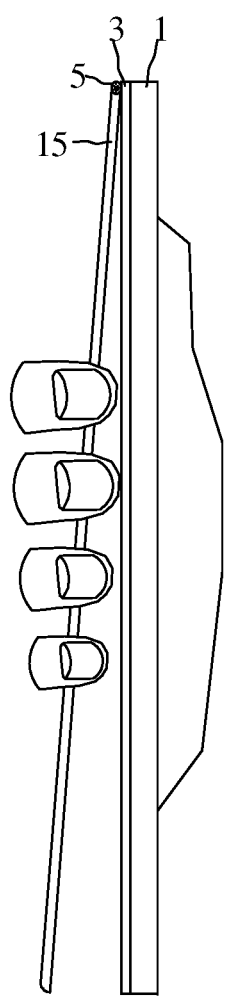
FIG. 23 is a side view of a display apparatus when the second shell is tilted up according to another embodiment of the present disclosure.

FIG. 21 is a top view of a second shell according to an embodiment of the present disclosure, FIG. 22 is a side view of a display apparatus when the second shell is tilted up according to an embodiment of the present disclosure, and FIG. 23 is a side view of a display apparatus when the second shell is tilted up according to another embodiment of the present disclosure. In an embodiment, as shown in FIG. 21 to FIG. 23, the second shell 4 includes a moving portion 15 and at least one fixing portion 14. The moving portion 15 and the fixing portion 14 are arranged in a direction parallel to a stretching direction y of the flexible display screen 1. The moving portion 15 rotates around the rotation portion 5 relative to the first shell 3, or the rotation portion 5 drives the moving portion 15 to rotate relative to the first shell 3, such that the fixing portion 14 can be fixedly connected to the shell of the display apparatus. The fixing portion 14 does not rotate during the process of retracting or deploying the flexible display screen 1.

With such a configuration, only a part of the second shell 4 is rotated relative to the first shell 3. The moving portion 15 and the fixing portion 14 are arranged in the direction parallel to the stretching direction y of the flexible display screen 1, such that no matter which end of the moving portion 15 is tilted up, there is a sufficient contact area with the user's fingers, thereby increasing the grasping strength of the user's fingers on the moving portion 15, and thus further improving the grasping by one hand.

Further, referring to FIG. 21 to FIG. 23 again, the moving portion 15 includes a first edge 16 and a second edge 17 that are opposite to each other. The first edge 16 and the second edge 17 each extend in a direction parallel to the stretching direction y of the flexible display screen 1. The rotation portion 5 is provided at the first edge 16 or the second edge 17.

Generally, a length L1 of the moving portion 15 in a direction perpendicular to the stretching direction y is greater than a width L2 of the moving portion 15 in the stretching direction y. When the rotation portion 5 is provided at the first edge 16, the second edge 17 is tilted up. When the rotation portion 5 is provided at the second edge 17, the first edge 16 is tilted up. That is, the top or bottom of the moving portion 15 is tilted up. Referring to FIG. 23, this tilting-up manner is more conducive to grasping by the user's fingers.

In another embodiment, referring to FIG. 8 again, the whole second shell 4 rotates around the rotation portion 5 relative to the first shell 3, or the rotation portion 5 drives the whole second shell 4 to rotate relative to the first shell 3. When the whole second shell 4 rotates relative to the first shell 3, it can not only increase the contact area between the tilt-up second shell 4 and the palm of the hand and prevent the display apparatus from dropping from the hand, but also have a higher support stability when the tilt-up second shell 4 serves as a holder.

Figure 24:
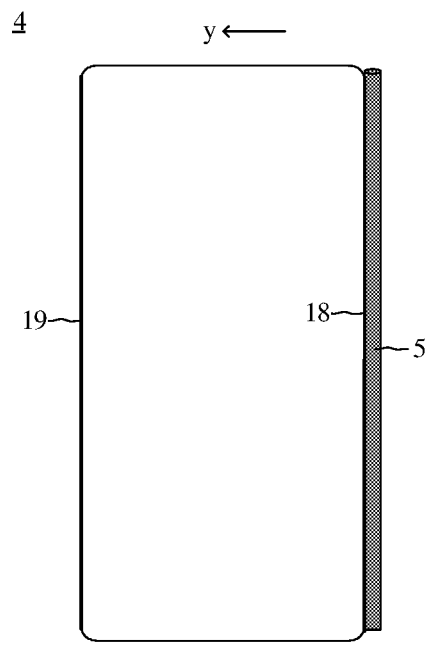
FIG. 24 is a top view of a second shell according to another embodiment of the present disclosure.

FIG. 24 is a top view of a second shell according to another embodiment of the present disclosure. Further, referring to FIG. 8, and as shown in FIG. 24, the second shell 4 includes a third edge 18 and a fourth edge 19 that are opposite to each other. The third edge 18 and the fourth edge 19 each extend in a direction perpendicular to the stretching direction y of the flexible display screen 1. A direction from the third edge 18 toward the fourth edge 19 is the stretching direction y of the flexible display screen 1. The rotation portion 5 is provided at the third edge 18.

That is, when the user grasps the display apparatus with one hand, an edge of the second shell 4 close to the wrist position is the third edge 18, and an edge of the second shell 4 close to the finger grasping side is the fourth edge 19. The rotation portion 5 is provided at the third edge 18, and the fourth edge 19 is tilted up. When the flexible display screen 1 and the first shell 3 are deployed along the stretching direction y, the user's fingers can insert into the gap between the fourth edge 19 of the second shell 4 and the first shell 3, such that the second shell 4 can be grasped more tightly. With such a configuration, the tilt-up manner of the second shell 4 is more suitable for finger grasping, and the display apparatus is less likely to dropping from the hand when the flexible display screen 1 is deployed.

Figure 25:
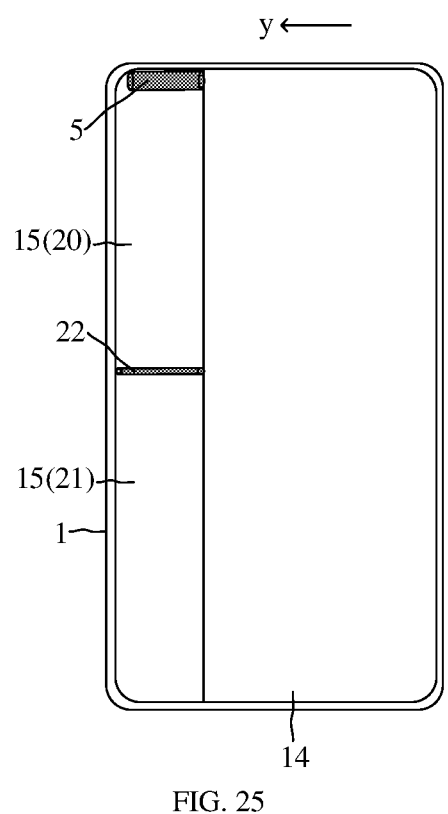
FIG. 25 is a structural schematic diagram showing a second shell in a retraction state according to an embodiment of the present disclosure.
Figure 26:
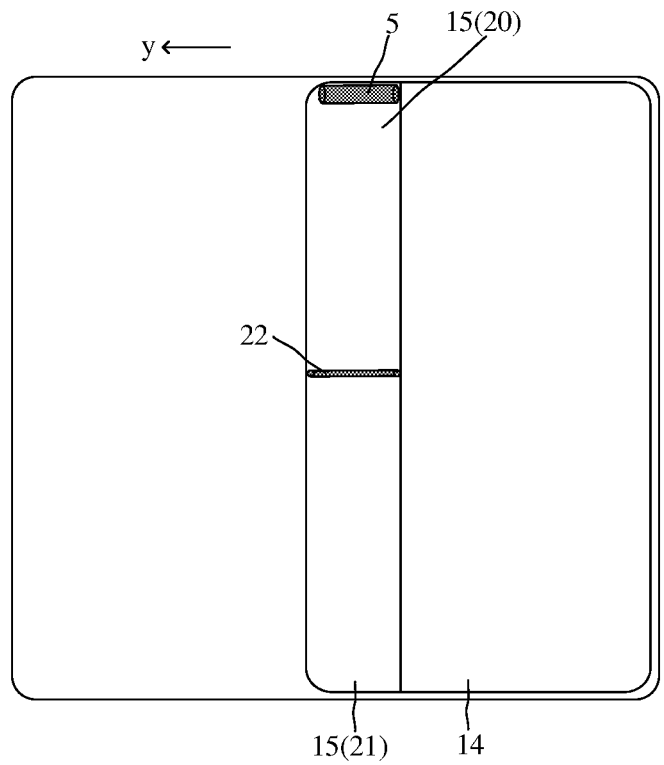
FIG. 26 is a structural schematic diagram showing a second shell in a deployment state according to an embodiment of the present disclosure.
Figure 27:
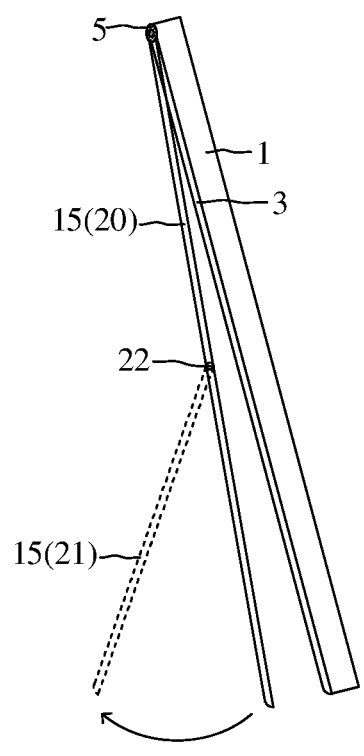
FIG. 27 is a schematic diagram showing support of the second shell corresponding to FIG. 25 and FIG. 26 according to an embodiment of the present disclosure.
Figure 28:
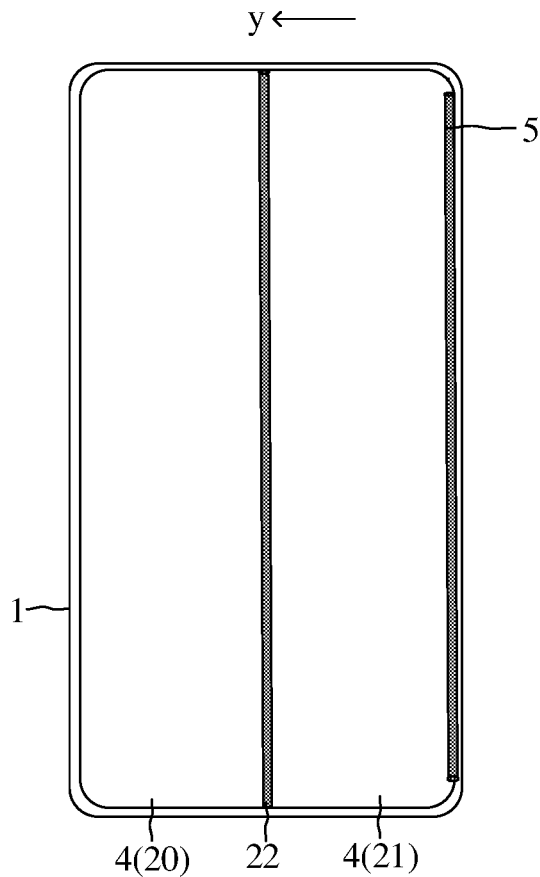
FIG. 28 is a structural schematic diagram showing a second shell in a retraction state according to another embodiment of the present disclosure.
Figure 29:
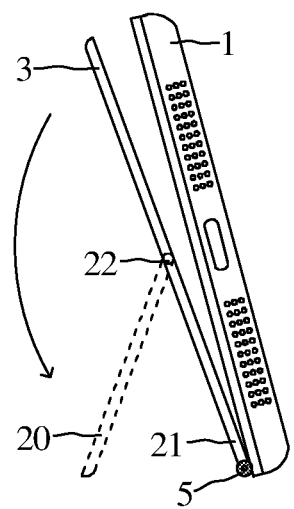
FIG. 29 is a schematic diagram showing support of a second shell corresponding to FIG. 28 according to an embodiment of the present disclosure.
Figure 30:
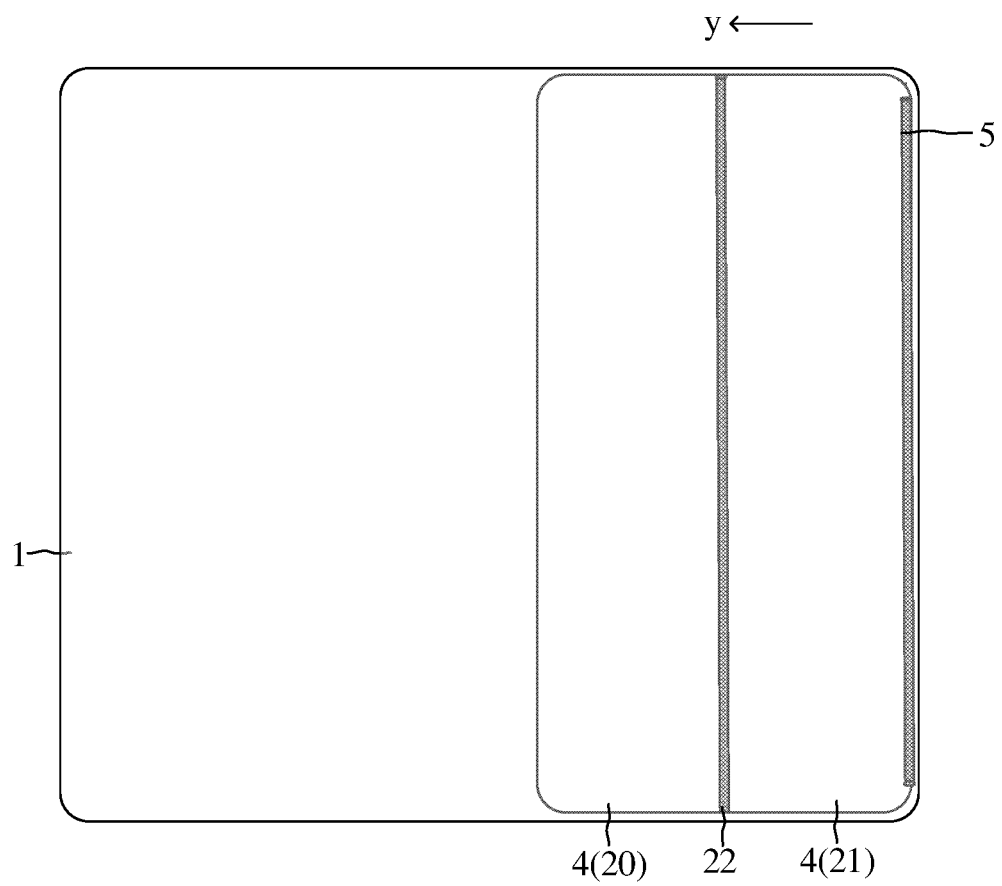
FIG. 30 is a structural schematic diagram showing a second shell in a deployment state according to another embodiment of the present disclosure.
Figure 31:
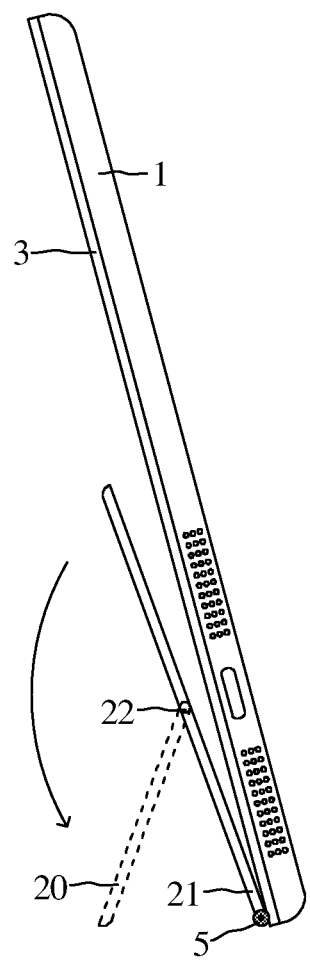
FIG. 31 is a schematic diagram showing support of the second shell corresponding to FIG. 30 according to an embodiment of the present disclosure.

FIG. 25 is a structural schematic diagram showing a second shell in a retraction state according to an embodiment of the present disclosure, FIG. 26 is a structural schematic diagram showing a second shell in an deployment state according to an embodiment of the present disclosure, FIG. 27 is a schematic diagram showing support of the second shell corresponding to FIG. 25 and FIG. 26 according to an embodiment of the present disclosure, FIG. 28 is a structural schematic diagram showing a second shell in a retraction state according to another embodiment of the present disclosure, FIG. 29 is a schematic diagram showing support of a second shell corresponding to FIG. 28 according to an embodiment of the present disclosure, FIG. 30 is a structural schematic diagram showing a second shell in a deployment state according to another embodiment of the present disclosure, and FIG. 31 is a schematic diagram showing support of the second shell corresponding to FIG. 30 according to an embodiment of the present disclosure. In an embodiment, as shown in the figures, at least a part of the second shell 4 includes a first portion 20 and a second portion 21. The first portion 20 is rotatably connected the second portion 21 through a bending shaft 22. An extension direction of the bending shaft 22 is perpendicular or parallel to the stretching direction y of the flexible display screen 1. When the first portion 20 or the second portion 21 is rotated to a certain extent, the bending shaft 22 is self-locked, such that an angle between the first portion 20 and the second portion 21 is kept.

It can be understood that, referring to FIG. 25 to FIG. 27 again, when the second shell 4 includes the moving portion 15 and the fixing portion 14, the first portion 20 and the second portion 21 are arranged at the moving portion 15.

With such a configuration, when the user needs to be in a movie-viewing mode or a working mode, when at least a part of the second shell 4 is used to support the display apparatus, by further rotating the first portion 20 or the second portion 21, the supporting angle of the second shell 4 can be adjusted to maintain the balance of the whole display apparatus, and an orientation of the screen can be adjusted to match the user's viewing angle better, thereby further improving the user's usage experience.

In an embodiment, referring to FIGS. 11 to 14 again, the display apparatus further includes a trigger assembly 6, a deploying-retracting control assembly 9, and a moving control assembly 12.

The trigger assembly 6 is configured to issue a deploying trigger signal. Referring to FIG. 11 again, the trigger assembly 6 is located in a driving chip 7 of the display apparatus. Referring to FIG. 12 again, the trigger assembly 6 may further include a button 8 located at a side of the flexible display screen 1. The deploying-retracting control assembly 9 is electrically connected to the trigger assembly 6 (not shown in the figures), to control the flexible display screen 1 and the first shell 3 to be synchronously deployed or synchronously retracted in response to the deploying trigger signal. The moving control assembly 12 controls at least a part of the second shell 4 to move away from the first shell 3.

Based on the structure described above, when the flexible display screen 1 needs to be deployed, the trigger assembly 6 issues the deploying trigger signal, and the deploying-retracting control assembly 9 controls the flexible display screen 1 and the first shell 3 to be synchronously deployed, such that the first shell 3 and the flexible display screen 1 can move synchronously, thereby improving the protective performance of the first shell 3 for the flexible display screen 1. Moreover, the second shell 4 and the first shell 3 can be separately controlled by the moving control assembly 12 and the deploying-retracting control assembly 9, the moving control assembly 12 can control the second shell 4 to move earlier or later than the first shell 3, or to move simultaneously with the first shell 3. The control manner of the second shell 4 is more flexible.

Further, the moving control assembly 12 is electrically connected to the trigger assembly 6, to control at least a part of the second shell 4 to move away from the first shell 3 in response to the deploying trigger signal.

Based on the structure described above and referring to FIG. 15, the moving control assembly 12 and the deploying-retracting control assembly 9 respond to a same deploying trigger signal. After the trigger assembly 6 issues the deploying trigger signal, the deploying-retracting control assembly 9 controls the flexible display screen 1 and the first shell 3 to be synchronously deployed, meanwhile, the moving control assembly 12 controls at least a part of the second shell 4 to be tilted up. In this way, when the flexible display screen 1 is deployed, the second shell 4 is simultaneously tilted up. While the second shell 4 improves the user's grasping by one hand, the control complexity of the moving control assembly 12 and the deploying-retracting control assembly 9 is reduced, and the time for movement of the whole bottom shell 2 is shortened.

In another embodiment, the trigger assembly 6 is configured to issue a moving trigger signal, and the time of issuing the moving trigger signal is earlier than the time of issuing the deploying trigger signal. The moving control assembly 12 is electrically connected to the trigger assembly 6, to control at least a part of the second shell 4 to move away from the first shell 3 in response to the moving trigger signal.

Based on the structure described above, referring to FIG. 16, the moving control assembly 12 and the deploying-retracting control assembly 9 respond to two different trigger signals, i.e., the deploying trigger signal and the moving trigger signal. Since the moving trigger signal is issued earlier, the moving control assembly 12 has already started to control at least a part of the second shell 4 to tilt up before the deploying-retracting control assembly 9 controls the flexible display screen 1 and the first shell 3 to be deployed. When the flexible display screen 1 starts to be deployed, a large angle is formed between the second shell 4 and the first shell 3, such that the user's fingers can grasp more easily.

Further, the display apparatus further includes a first sensor for monitoring the deployment state of the flexible display screen 1 and issuing a first detection signal containing current deployment state information. The current deployment state information is stretching ratio information or folding angle information of the flexible display screen 1. The moving control assembly 12 is electrically connected to the first sensor, to compare the current deployment state information contained in the first detection signal with the preset deployment state information that is pre-stored, and to control at least a part of the second shell 4 to move away from the first shell 3 in response to the current deployment state information being the same as the preset deployment state information.

Based on the structure described above and referring to FIG. 17, whether the second shell 4 is tilted up is selected by the moving control assembly 12 according to the deployment degree of the flexible display screen 1, such that such a tilt-up control mode is more flexible. For example, when the flexible display screen 1 starts to be deployed, the screen size is small, such that the user can still grasp it by one hand. At this time, the moving control assembly 12 does not need to control the second shell 4 to tilt up. However, as the flexible display screen 1 is continuously deployed, the screen size is gradually increased. When the screen size is increased to a screen size corresponding to the preset deployment state, it is difficult for the user to grasp by one hand. At this time, the moving control assembly 12 controls at least a part of the second shell 4 to tilt up to form a grasping portion.

Further, the display apparatus further includes a second sensor for detecting the deployment state of the flexible display 1 and issuing a second detection signal containing screen size information. The moving control assembly 12 is further electrically connected to the second sensor, to adjust an angle between at least a part of the second shell 4 and the first shell 3 based on the screen size information contained in the second detection signal.

Referring to FIG. 7, when the user needs to be in a movie-viewing mode or a working mode, the second shell 4 tilted up can be used as a holder for the display apparatus. The second sensor is used to detect the screen size information of the flexible display screen 1, and the moving control assembly 12 controls the tilting angle of the second shell 4 according to the detected screen size information, such that when the flexible display screen 1 has a larger screen size after being deployed, the second shell 4 is controlled to be tilted up at a larger angle; and when the flexible display 1 has a small screen size, the second shell 4 is controlled to be tilted up at a smaller angle, thereby matching the tilt-up angle of the second shell 4 with the screen size of the flexible display 1 after being deployed, and improving the supporting stability of the second shell 4.

In an embodiment, referring to FIGS. 13 and 14 again, the deploying-retracting control assembly 9 includes a first motor 10 and a reel 11. The first shell 3 and the flexible display 1 are wound on the reel 11. The first motor 10 is configured to control the reel 11 to wind or unwind. The moving control assembly 12 includes a second motor 13 configured to control at least a part of the second shell 4 to move away from or toward the first shell 3.

The first motor 10 controls the reel 11 to rotate, and then controls the first shell 3 and the flexible display 1 to be released from the reel 11, to deploy the first shell 3 and the flexible display 1 synchronously. Alternatively, the first motor 10 controls the first shell 3 and the flexible display 1 to be wound on the reel 11, to retract the first shell 3 and the flexible display 1 synchronously. The second motor 13 controls the rotation portion 5 to rotate, such that the rotation portion 5 drives at least part of the second shell 4 to rotate around the rotation portion 5 relative to the first shell 3.

In another embodiment, referring to FIG. 19 and FIG. 20 again, the trigger assembly 6 is further configured to drive the moving control assembly 12 to move. The moving control assembly 12 is in contact with the trigger assembly 6 and is detachably connected to at least a part of the second shell 4, to limit at least a part of the second shell 4, and to be separated from at least a part of the second shell 4 under driving of the trigger assembly 6 to move at least a part of the second shell 4 away from the first shell 3.

At this time, the trigger assembly 6 includes a button 8 located at a side of the flexible display screen 1. The trigger assembly 6 is configured not only to issue a deploying trigger signal, but also to drive the moving control assembly 12 to move. The moving control assembly 12 is in contact with the trigger assembly 6 and is detachably connected to at least a part of the second shell 4. When the button 8 is not pressed, the moving control assembly 12 limits at least a part of the second shell 4 to make the second shell 4 keep in a closed state. When the trigger assembly 6 is pressed, the trigger assembly 6 applies a pushing force to the moving control assembly 12, and the moving control assembly 12 is separated from at least a part of the second shell 4 under driving of the trigger assembly 6, such that at least a part of the second shell 4 is tilted up, which facilitates the user to grasp the second shell 4, thereby improving the grasping by one hand.

Figure 32:
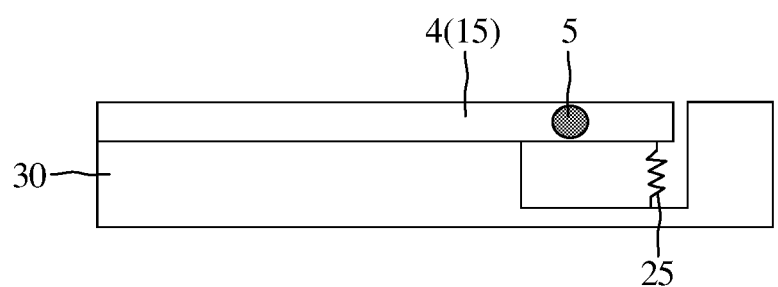
FIG. 32 is a cross-sectional view along an A1-A2 direction shown in FIG. 19 according to an embodiment of the present disclosure.
Figure 33:
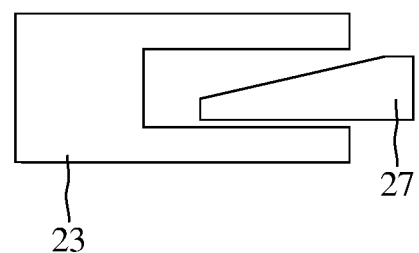
FIG. 33 is a cross-sectional view along a B1-B2 direction shown in FIG. 19 according to an embodiment of the present disclosure.

FIG. 32 is a cross-sectional view along an A1-A2 direction shown in FIG. 19 according to an embodiment of the present disclosure, and FIG. 33 is a cross-sectional view along a B1-B2 direction shown in FIG. 19 according to an embodiment of the present disclosure. Further, referring to FIG. 19 and FIG. 20, as shown in FIG. 32 and FIG. 33, at least a part of the second shell 4 includes a slot 23. The moving control assembly 12 includes a link lever 24, a first spring 25, and a second spring 26. A first end 29 of the link lever 24 is in contact with the trigger assembly 6. A second end 28 of the link lever 24 includes a plug 27 detachably inserted into the slot 23. The first spring 25 is connected to at least a part of the second shell 4 to apply a pulling force for pulling at least a part of the second shell 4 toward the flexible display screen 1. The second spring 26 is connected to the first end 29 of the link lever 24. The second spring 26 and at least a part of the second shell 4 are located at two opposite sides of the link lever 24, respectively. The second spring 26 is configured to apply a pulling force to the link lever 24.

It can be understood that when the second shell 4 includes the moving portion 15 and the fixing portion 14, the slot 23 is located at the moving portion 15, and the first spring 25 is connected to the moving portion 15. In addition, referring to FIG. 32 again, the display apparatus further includes an outer border 30 located at a side of the second shell 4 facing away from the first shell 3. One end of the first spring 25 is connected to at least a part of the second shell 4, and the another end of the first spring 25 is fixedly connected to the outer border 30.

Based on the structure described above, when the trigger assembly 6 is not pressed, the second spring 26 applies a pulling force to the first end 29 of the link lever 24, such that the plug 27 at the second end 28 of the link lever 24 tends to be inserted into the slot 23 to improve the limiting effect of the link lever 24 on at least a part of the second shell 4, thereby allowing the second shell 4 to be in a stable closed state. When the trigger assembly 6 is pressed, the trigger assembly 6 applies a pushing force to the first end 29 of the link lever 24, and the link lever 24 rotates under the action of the pushing force to pull the plug 27 at the second end 28 of the link lever 24 out of the slot 23. At this time, the link lever 24 no longer limits at least a part of the second shell 4, at least a part of the second shell 4 is tilted up under the pulling force for pulling the first spring 25 toward the flexible display screen 1.

In an embodiment, referring to FIG. 12 again, the trigger assembly 6 includes a button 8 located at a side of the flexible display screen 1. When the button 8 is pressed, a deploying trigger signal or a moving trigger signal is issued.

In an embodiment, referring to FIG. 12 again, the trigger assembly 6 only includes one button 8. When the trigger assembly 6 needs to issue two trigger signals (i.e., the deploying trigger signal and the moving trigger signal), the deploying trigger signal or the moving trigger signal can be issued by pressing the button 8 twice; alternatively, the button 8 can be pressed only once, the moving trigger signal is issued during a first half duration of the pressing time, and the deploying trigger signal is issued during a second half duration of the pressing time, thereby simplifying the design of the panel.

Figure 34:
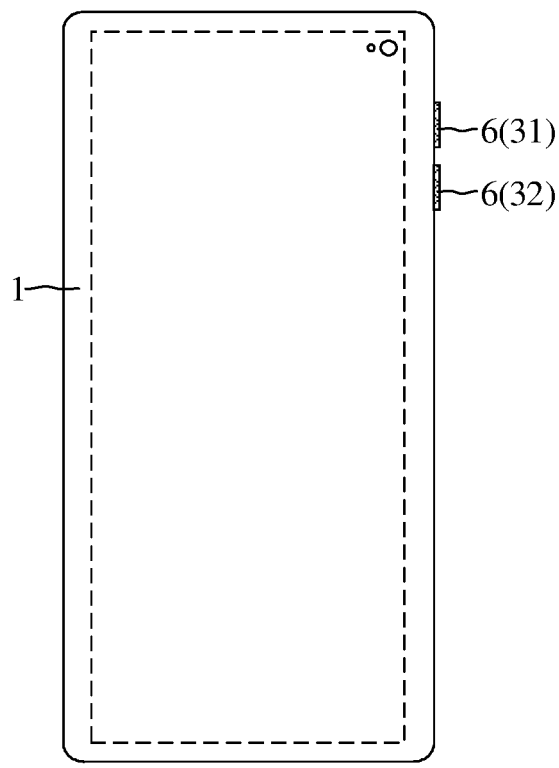
FIG. 34 is a structural schematic diagram showing a trigger assembly according to another embodiment of the present disclosure.

FIG. 34 is a structural schematic diagram showing a trigger assembly according to another embodiment of the present disclosure. In another embodiment, as shown in FIG. 34, a trigger assembly 6 includes a first button 31 and a second button 32 that are located at a side of the flexible display apparatus. When the first button 31 is pressed, a deploying trigger signal is issued. When the second button 32 is pressed, a moving trigger signal is issued. In this case, different trigger signals are issued by pressing different buttons, thereby achieving a higher reliability of the trigger signal.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

What is claimed is:

1. A method for controlling a display apparatus, the display apparatus comprising a flexible display screen and a bottom shell, wherein the bottom shell is located at a side of the flexible display screen facing away from a light-exiting direction of the display apparatus, the bottom shell comprises a first shell and a second shell, and the second shell is always located at a side of the first shell facing away from the flexible display screen; and the method comprising:
controlling the first shell and the flexible display screen to be synchronously deployed or synchronously retracted, in such a manner that the flexible display screen is always entirely covered by the first shell; and controlling at least a part of the second shell to move away from or toward the first shell at least along a first direction so that a preset angle is formed between the first shell and the at least a part of the second shell, wherein the first direction is perpendicular to a plane of the flexible display screen that is deployed.

2. The method according to claim 1, wherein the bottom shell comprises a rotation portion; and
said controlling the at least a part of the second shell to move away from or toward the first shell at least along the first direction comprises: controlling the at least a part of the second shell to rotate around the rotation portion relative to the first shell, or controlling the rotation portion to drive the at least a part of the second shell to rotate relative to the first shell.

3. The method according to claim 1, wherein said controlling the first shell and the flexible display screen to be synchronously deployed and controlling the at least a part of the second shell to move away from the first shell comprises:
issuing a deploying trigger signal by a trigger assembly;
controlling the flexible display screen and the first shell to be synchronously deployed by a deploying-retracting control assembly in response to the deploying trigger signal; and
controlling the at least a part of the second shell to move away from the first shell with a moving control assembly.

4. The method according to claim 3, wherein said controlling the at least a part of the second shell to move away from the first shell with the moving control assembly comprises: controlling the at least a part of the second shell to move away from the first shell by the moving control assembly in response to the deploying trigger signal.

5. The method according to claim 3, wherein said controlling the first shell and the flexible display screen to be synchronously deployed and controlling the at least a part of the second shell to move away from the first shell further comprises: further issuing a moving trigger signal with the trigger assembly, wherein a moment when the moving trigger signal is issued is earlier than a moment when the deploying trigger signal is issued; and
wherein said controlling the at least a part of the second shell to move away from the first shell by the moving control assembly comprises: controlling the at least a part of the second shell to move away from the first shell by the moving control assembly in response to the moving trigger signal.

6. The method according to claim 3, wherein said controlling the first shell and the flexible display screen to be synchronously deployed and controlling the at least a part of the second shell to move away from the first shell further comprises: monitoring a deployment state of the flexible display screen with a first sensor during a deploying process of the flexible display screen, and issuing a first detection signal containing current deployment state information by the first sensor; and
wherein said controlling the at least a part of the second shell to move away from the first shell by the moving control assembly comprises: comparing, by the moving control assembly, the current deployment state information contained in the first detection signal with preset deployment state information that is pre-stored, and controlling the at least a part of the second shell to move away from the first shell in response to the current deploying state information being the same as the preset deployment state information.

7. The method according to claim 6, wherein said controlling the first shell and the flexible display screen to be synchronously deployed and controlling the at least a part of the second shell to move away from the first shell further comprises:
detecting the deployment state of the flexible display screen with a second sensor, and issuing a second detection signal containing screen size information with the second sensor; and
adjusting an angle between the first shell and the at least a part of the second shell with the moving control assembly based on the screen size information contained in the second detection signal.

8. The method according to claim 3, wherein the moving control assembly is in contact with the trigger assembly, and is detachably connected to the at least a part of the second shell;
said controlling the first shell and the flexible display screen to be synchronously deployed and controlling the at least a part of the second shell to move away from the first shell further comprises: driving, with the trigger assembly, the moving control assembly to move; and
said controlling the at least a part of the second shell to move away from the first shell by the moving control assembly comprises: separating the moving control assembly from the at least a part of the second shell under driving of the trigger assembly, to cause the at least a part of the second shell to move away from the first shell.

9. A display apparatus, comprising:
a flexible display screen; and
a bottom shell located at a side of the flexible display screen facing away from a light-exiting direction of the display apparatus, wherein the bottom shell comprises a first shell and a second shell,
wherein the first shell and the flexible display screen are configured to synchronously deploy or synchronously retract, in such a manner that the flexible display screen is always entirely covered by the first shell; and
wherein the second shell is always located at a side of the first shell facing away from the flexible display screen, and the at least a part of the second shell moves away from or toward the first shell at least along a first direction so that a preset angle is formed between the first shell and the at least a part of the second shell; and the first direction is perpendicular to a plane of the flexible display screen when deployed.

10. The display apparatus according to claim 9, wherein the bottom shell comprises a rotation portion, the at least a part of the second shell is configured to rotate around the rotation portion relative to the first shell, or the rotation portion is configured to drive the at least a part of the second shell to rotate relative to the first shell.

11. The display apparatus according to claim 10, wherein the second shell comprises a moving portion and at least one fixing portion, the moving portion is configured to rotate around the rotation portion relative to the first shell, or the rotation portion is configured to drive the moving portion to rotate relative to the first shell, and
wherein the moving portion and the at least one fixing portion are arranged in a direction parallel to a stretching direction of the flexible display screen.

12. The display apparatus according to claim 11, wherein the moving portion comprises a first edge and a second edge disposed opposite each other, the first edge and the second edge are each configured to extend in a direction parallel to the stretching direction of the flexible display screen, and the rotation portion is provided at the first edge or the second edge.

13. The display apparatus according to claim 9, further comprising:
a trigger assembly configured to issue a deploying trigger signal;
a deploying-retracting control assembly electrically connected to the trigger assembly and configured to control the flexible display screen and the first shell to be synchronously deployed or synchronously retracted in response to the deploying trigger signal;
a moving control assembly configured to control the at least a part of the second shell to move away from the first shell.

14. The display apparatus according to claim 13, wherein the moving control assembly is electrically connected to the trigger assembly and is configured to control the at least a part of the second shell to move away from the first shell in response to the deploying trigger signal.

15. The display apparatus according to claim 13, wherein the trigger assembly is further configured to issue a moving trigger signal, and a moment when the moving trigger signal is issued is earlier than a moment when the deploying trigger signal is issued; and
the moving control assembly is electrically connected to the trigger assembly and is configured to control the at least a part of the second shell to move away from the first shell in response to the moving trigger signal.

16. The display apparatus according to claim 13, further comprising a first sensor configured to monitor a deployment state of the flexible display screen and issue a first detection signal containing current deployment state information, wherein the moving control assembly is electrically connected to the first sensor, and is configured to compare the current deployment state information contained in the first detection signal with a preset deployment state information that is pre-stored, and to control the at least a part of the second shell to move away from the first shell in response to the current deployment state information being the same as the preset deployment state information.

17. The display apparatus according to claim 16, further comprising a second sensor configured to detect the deployment state of the flexible display screen and issue a second detection signal containing screen size information, wherein the moving control assembly is further electrically connected to the second sensor, and is further configured to adjust an angle formed between the first shell and the at least a part of the second shell based on the screen size information contained in the second detection signal.

18. The display apparatus according to claim 13, wherein the deploying-retracting control assembly comprises a first motor and a reel, the first shell and the flexible display screen are wound on the reel, and the first motor is configured to control the reel to wind or unwind; and
the moving control assembly comprises a second motor configured to control the at least a part of the second shell to move away from or toward the first shell.

19. The display apparatus according to claim 13, wherein the trigger assembly is further configured to drive the moving control assembly to move; and
wherein the moving control assembly is in contact with the trigger assembly and is detachably connected to the at least a part of the second shell to limit the at least a part of the second shell and be separated from the at least a part of the second shell under driving of the trigger assembly so that the at least a part of the second shell moves away from the first shell.

20. The display apparatus according to claim 19, wherein the at least a part of the second shell comprises a slot; and
wherein the moving control assembly comprises:
a link lever comprising a first end in contact with the trigger assembly and a second end comprising a plug detachably inserted into the slot;
a first spring connected to the at least a part of the second shell, wherein the first spring is configured to apply a pulling force for pulling the at least a part of the second shell toward the flexible display screen; and
a second spring connected to the first end of the link lever, wherein the second spring is configured to apply a pulling force for pulling the at least a part of the second shell away from the flexible display screen when the plug is inserted into the slot.

* * * * *